May 13, 1969 E. O. SCHULZ-DU BOIS 3,444,483
PULSE BIAS CIRCUIT UTILIZING A HALF-WAVELENGTH
SECTION OF DELAY LINE
Filed Feb. 23, 1966
Sheet 1 of 2

INVENTOR
E. O. SCHULZ-DU BOIS
BY
Sylvan Sherman
ATTORNEY

United States Patent Office 3,444,483

Patented May 13, 1969

3,444,483

PULSE BIAS CIRCUIT UTILIZING A HALF-WAVELENGTH SECTION OF DELAY LINE

Erich O. Schulz-Du Bois, Oldwick, N.J., assignor to Bell Telephone Laboratories, Incorporated, New York, N.Y., a corporation of New York Filed Feb. 23, 1966, Ser. No. 529,398
Int. Cl. H03h 7/30
U.S. Cl. 333—29 7 Claims

ABSTRACT OF THE DISCLOSURE

A half-wavelength section of delay line is used as a power storing medium in a pulse biasing circuit for use with reactive loads. By interposing the delay line between the pulse source and the reactive load, the energy reflected at the load can be stored and reused. The arrangement is designed to reduce the average power dissipated in the biasing circuits of electro-optic modulators by from 90 to 99 percent. The circuit can be used to handle periodic or quasi-periodic pulse sequences.

This invention relates to a pulse biasing system using a resonant network as an energy storage medium.

The advent of the laser as a source of coherent wave energy has resulted in the development of a variety of electro-optic devices intended for use in optic transmission systems. Typically, such systems include an electro-optic material through which light is passed and across which an electric biasing field is impressed for the purpose of modulating some property of the light.

Because electro-optic devices tend to be capacitively reactive, they may be characterized, insofar as the biasing network is concerned, by a capacitance C. In a pulse biasing system, therefore, the bias source must be capable of supplying energy to the system at the rate of ½ $CV^2$ units of energy per pulse, where V is the voltage amplitude of the pulse.

The practice at present is to dissipate this stored energy at the end of each pulse. Obviously, this is a wasteful procedure. A measure of the amount of power thus dissipated can be illustrated by the following example. A KTN optical polarization switch has a capacitance of about 100 pf. If biased to 100 volts at an average repetition rate of 2 mc., the average power consumed is one watt. It is readily apparent that as the number of devices required per installation increases, and as the pulse repetition rate is raised, the power consumption will increase proportionately and may readily become a limiting factor.

It is, accordingly, the broad object of this invention to decrease the power requirements of pulse biasing circuits for use with reactive loads.

In accordance with the present invention, a resonant network is used as an energy storing medium in a pulse biasing circuit for use with reactive loads. By interposing the resonant network between the power source and the reactive load, the energy reflected by the load can be stored in the network and reused. The power source, as a result, is only called upon to make up the losses in the system.

In a first illustrative embodiment of the invention, a coaxial transmission line is used as an energy storage medium. In a second embodiment of the invention, a lumped-element transmission line is used. Arrangements are also disclosed for switching between two different loads and for using a combination of high impedance and low impedance lines.

These and other objects and advantages, the nature of the present invention, and its various features, will appear more fully upon consideration of the various illustrative embodiments now to be described in detail in connection with the accompanying drawings, in which:

FIG. 1 shows a first embodiment of the invention using a resonant length of coaxial line as an energy storage medium;

FIG. 2, included for purposes of explanation, is a time-distance display of conditions along the storage line at different times;

Figure 1:
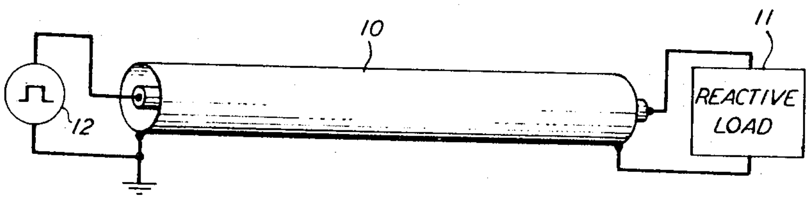

Referring to the drawings, FIG. 1 shows a first embodiment of the invention in which a length of coaxial transmission line 10 is used as a resonant network to store energy reflected by a reactive load 11 connected at the output end of the line. The load is any device to which periodic bias pulses are to be applied, and can be either capacitive or inductive.

A pulse source 12 is connected at the input end of line 10.

The operation of the network shown in FIG. 1 can be explained both in the frequency domain and in the time domain. For example, periodic voltage or current pulses consist of odd harmonics of the repetition frequency. Because of its linear dispersion characteristic, a coaxial transmission line is capable of propagating all these frequencies and maintaining their proper relative phase relationships. Accordingly, a pulse of energy applied at one end of line 10 maintains its pulse shape as it propagates back and forth along the line. In addition, the line is capable of resonating at all these frequencies simultaneously. Thus, the phase of the stored pulse relative to each of the subsequent pulses supplied by the pulse source is also properly maintained.

When load 11 is capacitive, and voltage pulses are called for, line 10 is an open-circuited section of line, half a wavelength long at the repetition frequency. By selecting a line whose characteristic impedance is low with respect to the impedances of the capacitive termination and the pulse source 12, the terminations appear essentially as open circuits at the respective ends of the line.

For situations in which the load is inductive in which case current pulses are to be provided, a short-circuited length of line is used. In this latter embodiment, the characteristic impedance of the line is made significantly larger than the impedances of the pulse source 12 and the load 11, in which case they appear essentially as short circuits across their respective ends of the line.

In either the open-circuit or the short-circuit embodiment, a significant difference in impedance between the line and load shall be understood to imply an impedance difference of the order of ten to one or greater.

Figure 2:
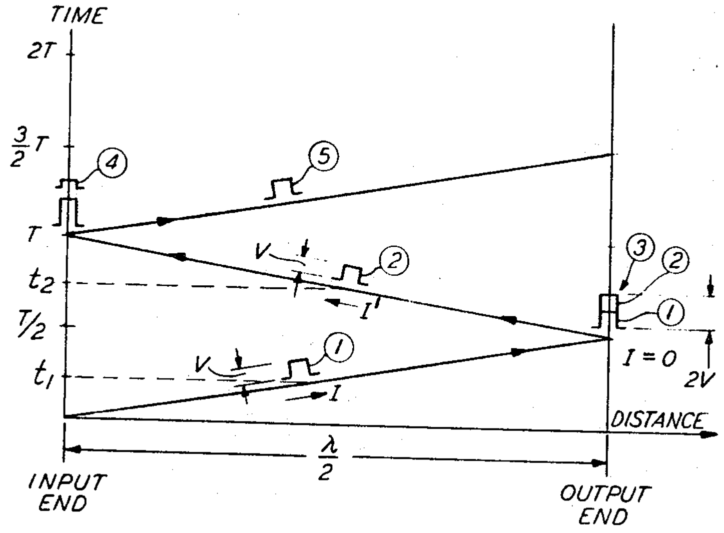

The operation of the pulse circuit of FIG. 1 can be illustrated more graphically in the time domain by means of the time-distance display of FIG. 2. In this representation, location along line 10 is represented along the horizontal direction, while time is represented along the vertical direction. More specifically, the input end of the line is located at the left of the horizontal axis, and the output end at the right, separated by half a wavelength of transmission line as measured at the pulse repetition rate. The vertical axis is marked in multiples of half a period, $T/2$, where T is the pulse repetition time.

Consider the steady state situation at a time $t_1$, at which instant pulse 1 is propagating along line 10 in the direction from left to right. The pulse is characterized by a voltage V and a current $$I=\frac{V}{Z_0}$$

where $Z_0$ is the characteristic impedance of line 10. Upon reaching the output end of the line at time $T/2$, the pulse is reflected in phase. The incident pulse 1 and the reflected pulse 2 thereby add to produce a voltage pulse 3 at load 11 whose amplitude is equal to 2V. However, the currents associated with the incident pulse and the reflected pulse are out of phase, and I at the output load is zero.

At a later time $t_2$ the reflected pulse 2 is propagating from right to left and is characterized by a voltage V and a current $$I'=-\frac{V}{Z_0}$$

The reflected pulse 2 reaches the input end of the line at time T where it is again reflected and where it is joined, in time phase, by the next pulse 4 in the pulse train supplied by the pulse source 12. Pulse 4 supplies the energy lost in the system such that the amplitude of the rereflected pulse 5 is again equal to V.

Figure 3:
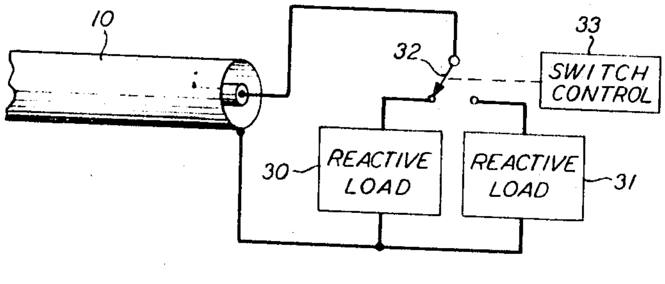
FIG. 3 shows an arrangement for switching between two loads.

It is apparent from FIG. 2 that it is only for the short period of time during which the pulse is at the output end of line 10 that the load is energized, and that the load is totally deenergized during the remainder of the period. Thus, switching operations may be performed at the load during the deenergized portion of the period without in any way affecting the pulse energy stored elsewhere along the line. For example, two different loads may be used and means provided for switching between them in accordance with some prearranged sequence, thus making it possible to bias two different loads in a quasi-random pulse sequence using a periodic pulse source. Such an arrangement is illustrated in FIG. 3, which shows the output end of line 10, including two loads 30 and 31, a switch 32, and a switch control 33. The latter can be programmed, or otherwise controlled, so as to activate switch 32 and, thereby, connect either of the two loads 30 or 31 to line 10.

Figure 4:
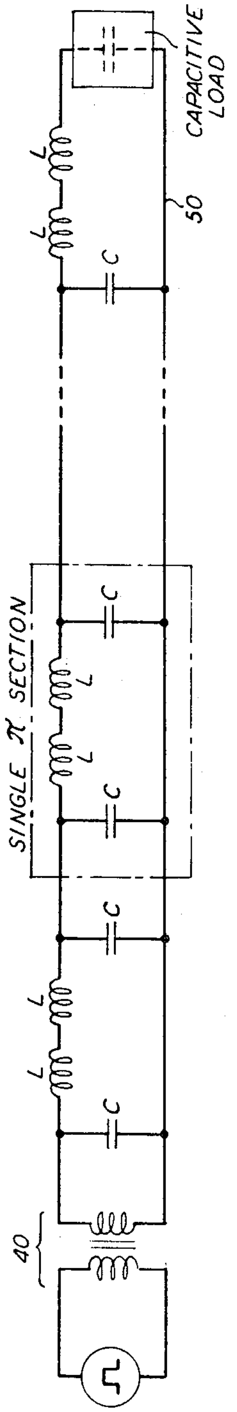
FIG. 4 shows a second illustrative embodiment of the invention using lumped-element transmission line.

In the illustrative embodiments of FIGS. 1 and 3, the resonant storage network is illustrated as a coaxial transmission line. In general, any homogeneous TEM mode-supporting transmission line can be used for this purpose. Alternatively, a lumped-element transmission line can be used. The choice would, of course, depend upon the application at hand and, in particular, upon the pulse repetition rate. As an example of a lumped-element design, let it be required to provide voltage biasing across a 100 pf. optical polarization switch at a one mc. repetition rate and duty cycle of ½. Since a lumped-element structure has an upper cut-off frequency, it must be considered in the design in order to maintain the pulse shape. If, for example, the quality of the voltage pulses is considered adequate when frequencies up to the ninth harmonic are included, then the upper cut-off frequency of the network must at least be higher than 10 mc. One simple design for the line, therefore, comprises ten identical $\pi$-sections as illustrated in FIG. 4, in which L equals 2.5 microhenries and C equals 100 pf. The characteristic impedance of such a line is 160 ohms. It will be noted that in the embodiment of FIG. 4 the capacitance of the last $\pi$-section is supplied by the load itself.

Some phase correction may be necessary since the phase shift $\beta$ per filter section is not exactly a linear function of frequency. This can be achieved by means of an m-derived filter, corrected to give a linear dispersion characteristic.

As noted above, the use of a resonant line as an energy storage medium substantially reduces the power requirements of the pulse source. Once steady state conditions are achieved, the pulse source is only called upon to supply the system losses. One way of coupling the power source to a lumped-element resonant line is by means of a transformer 40, as illustrated in FIG. 4. When the line termination is open-circuited, the transformer would have to have a sufficiently high inductance at its secondary so as not to compromise the open-circuit at the input end of the line. Similarly, for a line with short-circuited termination, the transformer secondary would have to be of low enough inductance so as not to compromise the short circuit at the input end of the line.

Figure 5:
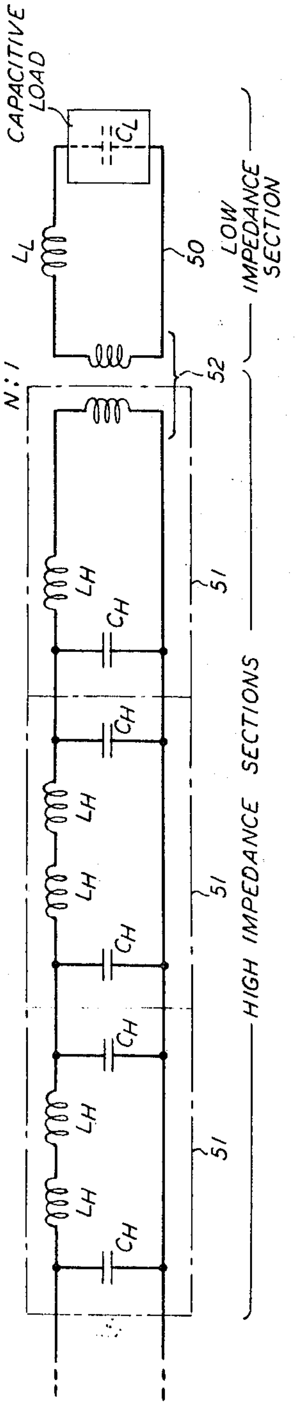
FIG. 5 is an arrangement for coupling a low impedance section of line to a high impedance section of line for use with low impedance capacitive loads.

It was mentioned hereinabove that the impedance of the resonant storage network is either much larger or much smaller than the load reactance. A point can be reached, however, where to satisfy this condition may result in a poor storage network. For example, if the load is a large capacitance, a very low impedance network would be required. This implies a network of the type illustrated in FIG. 4 wherein the shunt capacitances are large and the series inductances small. The problem with such an arrangement is that a low impedance line typically has a low Q and, hence, the power dissipation is correspondingly high. To avoid this, an arrangement such as shown in FIG. 5 can be used, in which one low impedance section 50 is used at the end of the line, while the rest of the line is formed of high impedance sections 51. The two sections are match-coupled together by means of a 1:N transformer 52.

Designating the impedance of section 50 as $Z_L$, and that of sections 51 as $Z_H$, we have that $$Z_L=\sqrt{\frac{L_L}{C_L}}$$

$$Z_H=\sqrt{\frac{L_H}{C_H}}$$

and $$Z_H=N^2Z_L$$

where $$Z_L<Z_H,\ L_L<L_H$$

and $$C_L>C_H$$

Such a network allows the major portion of the resonant line to be at a higher impedance and high Q, while still satisfying the requirement that the load impedance be large compared to the impedance of the line to which it is connected.

In all cases it is understood that the above-described arrangements are illustrative of but a small number of the many specific embodiments which can represent applications of the principles of the invention. Thus, numerous and varied other arrangements can readily be devised in accordance with these principles by those skilled in the art without departing from the spirit and scope of the invention.

What is claimed is:

1. A pulse biasing circuit comprising:
a source of repetitive pulses;
a reactive load; and means for connecting said source to said load comprising a transmission line whose equivalent electrical length is equal to an integral multiple of half a wavelength at the repetition rate of said pulses and whose characteristic impedance is significantly different than the impedances of said source and said load.

2. The circuit according to claim 1 wherein said line is a homogeneous transmission line.

3. The circuit according to claim 1 wherein said line is a lumped-element transmission line.

4. The circuit according to claim 1 wherein said load is capactive; and
wherein the characteristic impedance of said line is significantly smaller than the impedance of said load.

5. The circuit according to claim 1 wherein said load is inductive; and
wherein the characteristic impedance of said line is significantly larger than the impedance of said load.

6. The circuit according to claim 1 including more than one reactive load; and
including switching means for connecting only one of said loads to said line at any one time.

7. The circuit according to claim 1 wherein said line comprises sections of different characteristic impedances; and
including means for match-coupling said sections of line.

References Cited

UNITED STATES PATENTS

| | | | |
|---|---|---|---|
| 2,691,727 | 10/1954 | Lair | 333—29 X |
| 3,122,648 | 2/1964 | Rufer | 328—67 X |
| 3,383,526 | 5/1968 | Berding | 333—20 X |

OTHER REFERENCES

Chance et al.: Waveforms, Rad. Lab. Series 19, McGraw-Hill, N.Y., 1949, p. 249 relied on.

Kimbark: Electrical Transmission of Power and Signals, Wiley & Sons, N.Y., 1949, pp. 160, 161 relied on.

Moreno: Microwave Transmission Design Data, Dover Publ., N.Y., 1948, p. 39 relied on.

HERMAN K. SAALBACH, *Primary Examiner.*

P. L. GENSLER, *Assistant Examiner.*

U.S. Cl. X.R.

333—24, 31; 328—56, 65, 66